(12) United States Patent
Hirota et al.

(10) Patent No.: US 11,597,982 B2
(45) Date of Patent: Mar. 7, 2023

(54) PRODUCTION PROCESS OF FINE-GRAINED AUSTENITIC STAINLESS STEEL

(71) Applicant: JAPAN ATOMIC ENERGY AGENCY, Ibaraki (JP)

(72) Inventors: Noriaki Hirota, Ibaraki (JP); Tomoaki Takeuchi, Ibaraki (JP); Hiroko Nakano, Ibaraki (JP); Atsushi Kikuchi, Tokyo (JP)

(73) Assignee: JAPAN ATOMIC ENERGY AGENCY, Ibaraki (JP)

(*) Notice: Subject to any disclaimer, the term of this patent is extended or adjusted under 35 U.S.C. 154(b) by 210 days.

(21) Appl. No.: 16/578,755

(22) Filed: Sep. 23, 2019

(65) Prior Publication Data
US 2020/0102625 A1 Apr. 2, 2020

(30) Foreign Application Priority Data
Sep. 28, 2018 (JP) .............................. JP2018-184179

(51) Int. Cl.
| | | |
|---|---|---|
| *C22C 38/02* | (2006.01) | |
| *C21D 9/46* | (2006.01) | |
| *C22C 38/44* | (2006.01) | |
| *C22C 38/04* | (2006.01) | |
| *C21D 6/00* | (2006.01) | |
| *C21D 8/02* | (2006.01) | |

(52) U.S. Cl.
CPC .............. *C21D 9/46* (2013.01); *C21D 6/004* (2013.01); *C21D 6/005* (2013.01); *C21D 6/008* (2013.01); *C21D 8/0205* (2013.01); *C22C 38/02* (2013.01); *C22C 38/04* (2013.01); *C22C 38/44* (2013.01)

(58) Field of Classification Search
CPC ......... C22C 38/02; C22C 38/04; C22C 38/40; C22C 38/44
See application file for complete search history.

(56) References Cited

U.S. PATENT DOCUMENTS

3,623,920 A * 11/1971 Kondo .................... C21D 8/005
148/608
10,329,649 B2 * 6/2019 Leinonen ................. C21D 1/42

FOREIGN PATENT DOCUMENTS

| EP | 0 964 072 | 12/1999 |
|---|---|---|
| EP | 2 508 639 | 10/2012 |

(Continued)

OTHER PUBLICATIONS

Hirano et al., "The Effect of Dissolved Oxygen on the Stress Corrosion Cracking of Stainless Steel in High Temperature Water", Corros. Eng. (Jpn.), 31, pp. 517-525, 1982, English abstract included.
(Continued)

*Primary Examiner* — Nicholas A Wang
*Assistant Examiner* — Maxwell Xavier Duffy
(74) *Attorney, Agent, or Firm* — Wenderoth, Lind & Ponack, L.L.P.

(57) ABSTRACT

A process of producing a fine-grained austenitic stainless steel, the process comprising a step of subjecting a fine-grained austenitic stainless steel comprising: C: 0.15 wt % or less, Si: 1.00 wt % or less, Mn: 2.0 wt % or less, Ni: 6.0 to 14.0 wt %, Cr: 16.0 to 22.0 wt %, and Mo: 3.0 wt % or less, with the balance being Fe and inevitable impurities, and having an average grain size of 10 μm or lower, to an annealing treatment at a temperature from 600° C. to 700° C. for 48 hours or longer.

5 Claims, 17 Drawing Sheets

(56) References Cited

FOREIGN PATENT DOCUMENTS

| JP | 2003-193202 | 7/2003 | | |
|---|---|---|---|---|
| JP | 2003-231919 | 8/2003 | | |
| JP | 2006-233292 | 9/2006 | | |
| WO | 99/09229 | 2/1999 | | |
| WO | 2011/067979 | 6/2011 | | |
| WO | WO-2013107922 A1 * | 7/2013 | ............. | C21D 8/005 |

OTHER PUBLICATIONS

Matsushima et al., "Effect of Environmental Factors or Stress Corrosion Cracking of the Ni-base Alloy 600 in Oxygenated High Temperature Water", J. Japan Inst. Metals., 46 (5), pp. 526-529, 1982, English abstract included.

Takeuchi et al, "Effect of dissolved gas on mechanical property of sheath material of mineral insulated cables under high temperature and pressure water", Nuclear Materials and Energy, 9, pp. 451-454, 2016.

Notice of Reasons for Refusal dated Aug. 9, 2022, in corresponding Japanese Patent Application No. 2018-184179, with English Machine translation.

* cited by examiner

Full view of fracture surface  Enlarged view of brittle fracture  Side view of fracture surface
surface Full view of fracture surface    Enlarged view of brittle fracture surface    Side view of fracture surface Full view of fracture surface    Enlarged view of brittle fracture surface    Side view of fracture surface Full view of fracture surface   Enlarged view of brittle fracture surface   Side view of fracture surface Full view of fracture surface    Enlarged view of ductile fracture surface    Side view of fracture surface Full view of fracture surface    Enlarged view of ductile fracture surface    Side view of fracture surface Full view of fracture surface    Enlarged view of ductile fracture surface    Side view of fracture surface Full view of fracture surface   Enlarged view of ductile fracture surface   Side view of fracture surface Full view of fracture surface    Enlarged view of ductile fracture surface    Side view of fracture surface

PRODUCTION PROCESS OF FINE-GRAINED AUSTENITIC STAINLESS STEEL

TECHNICAL FIELD

The present invention relates to a production process of a fine-grained austenitic stainless steel. More specifically, the present invention relates to a production process of an austenitic stainless steel showing an excellent strength-ductility balance under tensile stress at an elevated temperature in the presence of dissolved oxygen.

BACKGROUND ART

Currently, construction of nuclear power plants is actively progressing in some countries for the purpose of reducing $CO_2$ emission and of accommodating the demand for electricity. Meanwhile, in Japan, some light water reactors that conform to the new regulatory standards have been restarted slowly after the earthquake. There is also a possibility that, not only pressurized water reactors, but also boiling water reactors would be restarted in the future. With regard to the core internal or the fuel cladding tube used for these nuclear plants, austenitic stainless steel is primarily employed as the structural material thereof. However, austenitic stainless steel is susceptible to intergranular and transgranular stress corrosion cracking induced by the combined action of the constituents of the stainless steel, dissolved oxygen, environmental factors, and residual tensile stress. In Non-Patent Document 1, it is reported that, concerning 304 stainless steel (SUS304), intergranular stress corrosion cracking occurs in high temperature water with a dissolved oxygen content of 0.2 ppm or higher, whereas transgranular stress corrosion cracking occurs when the dissolved oxygen content is in the range from 20 to 100 ppb. In addition, there is another problem concerning this material. This material may not withstand excessive stress when used as a structural member because the tensile strength thereof is around 520 MPa, which strength is far from high enough for such application.

Under these circumstances, a variety of material have been developed heretofore in order to solve the above problems. In particular, with regard to austenitic stainless steel SUS316, compositional modification has been made by reducing the carbon content to a minimum so as to suppress formation of a grain boundary Cr-depleted zone. Additionally, SUS316FR showing a improved creep strength as a result of nitrogen addition has also been developed. Additionally, in order to suppress corrosion cracking propagation owing to dissolved oxygen, an attempt to modify an existing structure on-site has been made by injecting hydrogen into the structure. Furthermore, for the purpose of reducing residual tensile stress, a countermeasure has also been examined whereby a residual compressive stress is intentionally imparted to the surface of the structure of interest by means of, for example, shot peening. Recently, as described in Non-Patent Document 2, suppression of stress corrosion cracking by use of Ni based alloy, IN600, has also been examined. Nevertheless, it is not confirmed whether any one of these countermeasures can totally prevent the stress corrosion cracking depending on the dissolved oxygen content. In particular, according to Non-Patent Document 3, it was further revealed recently that, in the presence of dissolved oxygen less than 1 ppb, which oxygen content is further lower than those previously examined, stress corrosion cracking occurs at an earlier stage in SUS304 steel and SUS316 steel. Accordingly, now it would be desirable to investigate and understand in great detail the stress corrosion cracking phenomenon depending on the dissolved oxygen content, and properties which may be affected by such stress corrosion cracking such as tensile strength, elongation, and fracture surface morphology, to thereby develop a material unsusceptible to the stress corrosion cracking. On the other hand, in recently published Patent Document 1, it is reported that stress corrosion cracking in the conventional steel, SUS304, can be suppressed by adjusting the (crystal) grain size to only 10 μm or lower. However, concerning this material, it is not clearly known how the varying dissolved oxygen contents affect the phenomenon of embrittlement. According to Patent Document 2, stainless steel sensitization caused by Cr-depletion can be suppressed by means of rapid heating and rapid cooling during the production process of fine-grained stainless steel so as to increase the Cr concentration in the grain boundary zones by 2% or more than the Cr concentration of the matrix phase. However, rapid heating and rapid cooling promote segregation in the matrix of the fine-grained stainless steel, and therefore a desired ductility cannot be attained. As a result of that, a specimen during slow strain rate test (SSRT), which test requires the specimen to deform uniformly, may undergo brittle fracture. In particular, it is known that, in duplex stainless steel in which ferrite phase and austenite phase coexist, σ phase, which promotes embrittlement, is formed in a region with high Cr concentration. For this reason, increasing the Cr concentration, which is advantageous to the suppression of segregation, may adversely cause the σ embrittlement.

PRIOR ART REFERENCES

Patent Documents

Patent Document 1: International Publication WO2011/067979
Patent Document 2: Japanese Unexamined Patent Application Publication No. 2006-233292

Non-Patent Documents

Non-Patent Document 1: Corros. Eng. (Jpn.), 31: pp. 517-525 (1982)
Non-Patent Document 2: Japan Inst. Metals, 46 (5): pp. 526-529 (1982)
Non-Patent Document 3: T. Takeuchi, Nuclear Materials and Energy, 9: pp. 451-454 (2016)

SUMMARY OF INVENTION

As described above, no successful attempt has been made with regard to austenitic stainless steel to solve the problems concerning prolonged structural stability, insusceptibility to dissolved oxygen content, and strength-ductility properties under tensile stress, which are necessary for a member for a nuclear reactor.

Accordingly, the present invention aims to develop a material suitable for a member for a nuclear reactor, which member has stability of the fine-grained structure under an elevated temperature, insusceptibility to variation in dissolved oxygen content, and a good strength-ductility balance under tensile stress.

The present inventors made intensive studies to solve the above problems. As a result of that, the present inventors have found that the problems which had occurred in a member for a nuclear reactor and in a nuclear fuel reprocessing plant caused by the intergranular and transgranular stress corrosion cracking that induces brittle fracture depending on dissolved oxygen content can be solved by refining the grain size to an average grain size to 10 μm or lower, followed by subjecting the resulting material to a prolonged anneal treatment at a lower temperature, to thereby obtain a material in which the brittle fracture is suppressed and exhibits a good tensile strength-ductility balance. Based on such findings, the present invention has been accomplished. Hence, the present invention relates to a stainless steel without the above problems.

The gist of the present invention is as follows:

[1] A process of producing a fine-grained austenitic stainless steel, said process comprising a step of subjecting a fine-grained austenitic stainless steel comprising: C: 0.15 wt % or less, Si: 1.00 wt % or less, Mn: 2.0 wt % or less, Ni: 6.0 to 14.0 wt %, Cr: 16.0 to 22.0 wt %, and Mo: 3.0 wt % or less, with the balance being Fe and inevitable impurities, and having an average grain size of 10 μm or lower, to an annealing treatment at a temperature from 600° C. to 700° C. for 48 hours or longer.

[2] The process according to [1], wherein said fine-grained austenitic stainless steel is used in a nuclear application.

[3] A fine-grained austenitic stainless steel for nuclear application comprising: C: 0.15 wt % or less, Si: 1.00 wt % or less, Mn: 2.0 wt % or less, Ni: 6.0 to 14.0 wt %, Cr: 16.0 to 22.0 wt %, and Mo: 3.0 wt % or less, with the balance being Fe and inevitable impurities, and having an average grain size of 10 μm or lower,
wherein the fine-grained austenitic stainless steel exhibits a tensile strength×elongation balance of 17000 MPa % or higher in slow strain rate test at a temperature of 325° C. and a pressure of 15 MPa with a dissolved oxygen content of lower than 1 ppb.

[4] The fine-grained austenitic stainless steel for nuclear application according to [3], wherein the fine-grained austenitic stainless steel exhibits a tensile strength of 750 MPa or higher and an elongation of 22% or higher in slow strain rate test at a temperature of 325° C. and pressure of 15 MPa with a dissolved oxygen content of lower than 1 ppb.

[5] The fine-grained austenitic stainless steel for nuclear application according to [3] or [4], wherein the fine-grained austenitic stainless steel exhibits a percent brittle fracture of lower than 6% at a temperature of 325° C. and a pressure of 15 MPa with a dissolved oxygen content of lower than 1 ppb.

[6] The fine-grained austenitic stainless steel according to any one of [3] to [5], wherein the chromium carbide content of the stainless steel is not more than 30% with respect to that of the raw material thereof, coarse-grained stainless steel.

[7] A fine-grained austenitic stainless steel comprising: C: 0.15 wt % or less, Si: 1.00 wt % or less, Mn: 2.0 wt % or less, Ni: 6.0 to 14.0 wt %, Cr: 16.0 to 22.0 wt %, and Mo: 3.0 wt % or less, with the balance being Fe and inevitable impurities, and having an average grain size of 10 μm or lower,
wherein the variation in the Si concentration in the stainless steel is in the range less than ±0.3 wt % with respect to the Si concentration of the raw material thereof, coarse-grained stainless steel.

[8] The fine-grained austenitic stainless steel according to any one of [3] to [7], wherein said stainless steel is used in a nuclear application.

The present invention provides a production process of an austenitic stainless steel exhibiting a good strength-ductility balance under tensile stress at an elevated temperature in the presence of dissolved oxygen, and the austenitic stainless steel having the above properties, and others.

BRIEF DESCRIPTION OF THE DRAWINGS

FIG. 1A is a microscopic image of the microstructure of the fine-grained stainless steel as refined. FIG. 1B is a microscopic image of the microstructure of the material obtained by subjecting the fine-grained stainless steel as refined to an anneal treatment at 600° C. for 100 hours.

the fracture surface was formed during SSRT test performed at 325° C./15 MPa with a dissolved oxygen content of 8 ppm.

Figure 14:
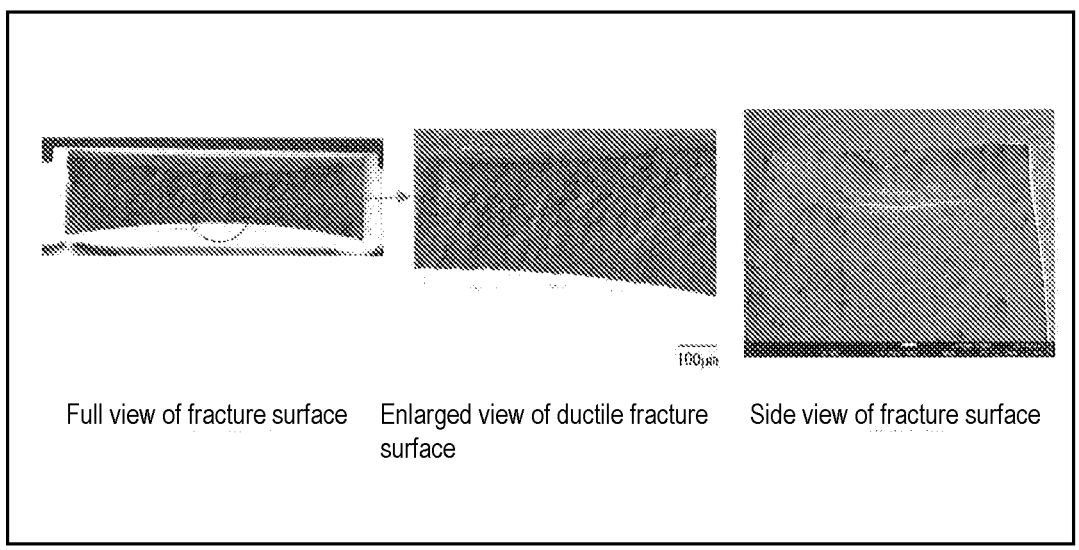

FIG. 14 illustrates SEM images of the fracture surfaces (photographs) of a fine-grained stainless steel SUS304; the fracture surface was formed during SSRT test performed at 325° C./15 MPa with a dissolved oxygen content of 8 ppm.

Figure 15:
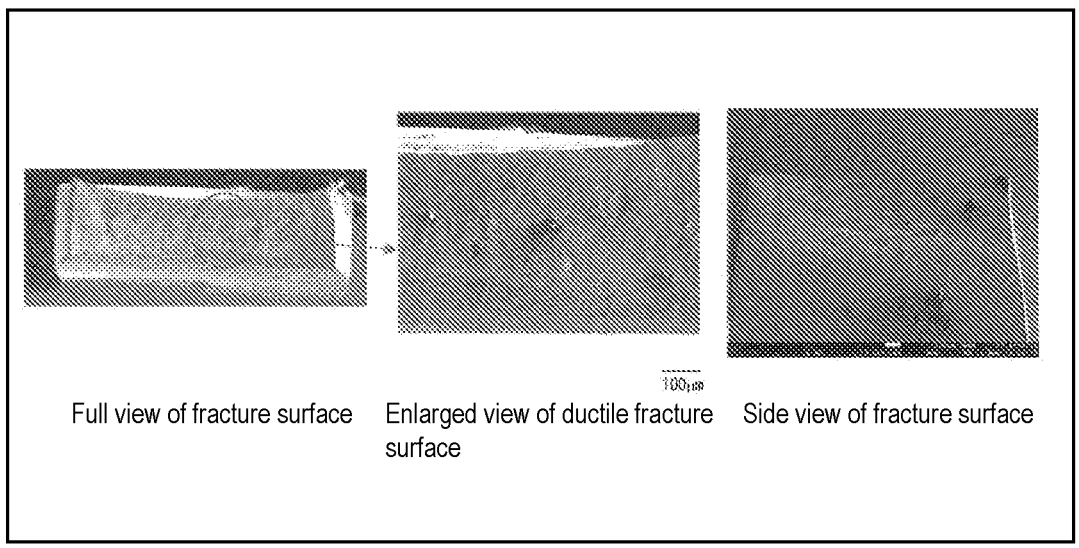

FIG. 15 illustrates SEM images of the fracture surfaces (photographs) of a fine-grained stainless steel SUS304 undergone an anneal treatment at 600° C. for 100 hours; the fracture surface was formed during SSRT test performed at 325° C./15 MPa with a dissolved oxygen content of 8 ppm.

Figure 16:
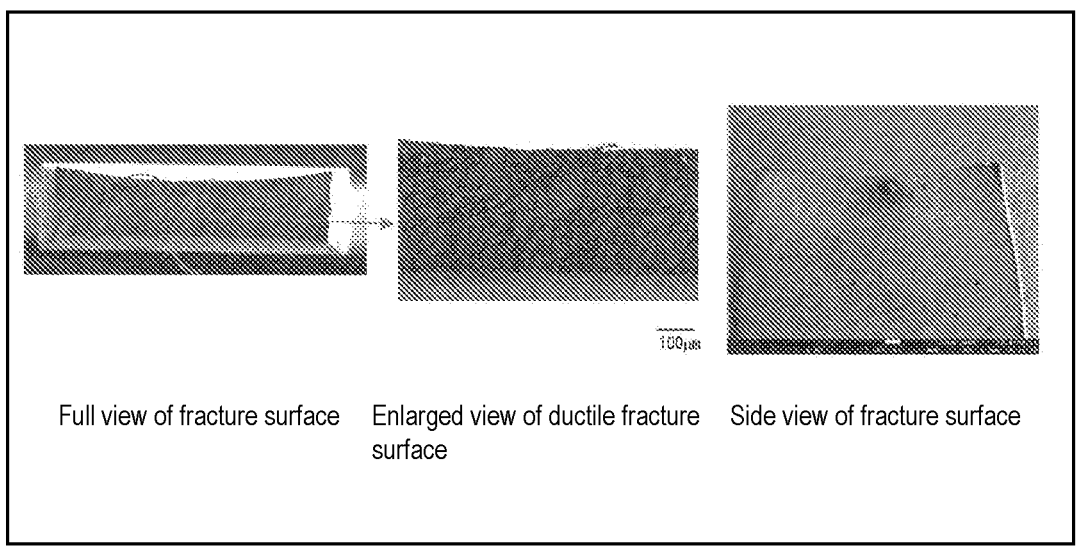

FIG. 16 illustrates SEM images of the fracture surfaces (photographs) of a fine-grained stainless steel SUS304 undergone an anneal treatment at 700° C. for 100 hours; the fracture surface was formed during SSRT test performed at 325° C./15 MPa with a dissolved oxygen content of 8 ppm.

Figure 17:
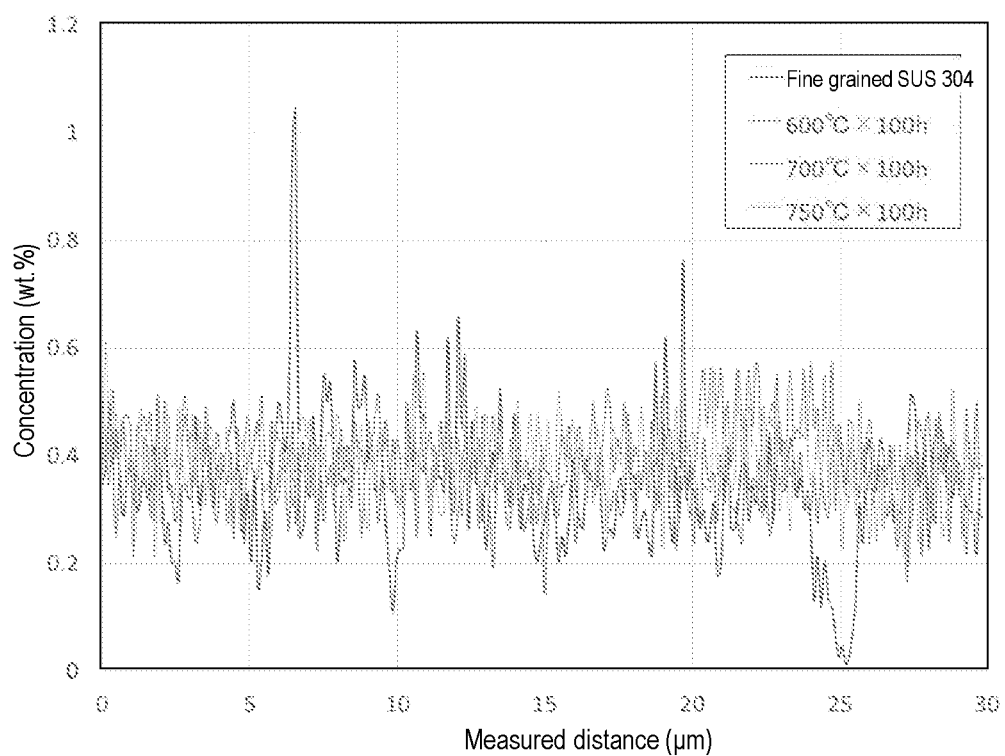

FIG. 17 illustrates EPMA analysis results for Si concentration along the direction perpendicular to the rolling direction in a fine-grained stainless steel prior to and subsequent to an anneal treatment.

EMBODIMENTS FOR CARRYING OUT THE INVENTION

The present invention will be described hereinbelow.
<Production Process>
In one aspect, the present invention relates to a production process of a fine-grained austenitic stainless steel, comprising a step of subjecting a fine-grained austenitic stainless steel comprising: C: 0.15 wt % or less, Si: 1.00 wt % or less, Mn: 2.0 wt % or less, Ni: 6.0 to 14.0 wt %, Cr: 16.0 to 22.0 wt %, and Mo: 3.0 wt % or less, with the balance being Fe and inevitable impurities, and having an average grain size of 10 µm or lower, to an annealing treatment at a temperature from 600° C. to 700° C. for 48 hours or longer.

The chemical composition of stainless steel will be described. The expression "%" as used herein for the content of each element means % by mass.
<Chemical Composition of Stainless Steel>
C is an austenite forming element, and is added for the purpose of ensuring stability of the austenitic structure. When C is added in a large amount, the resultant material becomes hardened, leading to deterioration of workability. Furthermore, it promotes carbide precipitation, and consequently the stress corrosion cracking resistance, which is an object of the present invention sought to be attained, is impaired. Therefore, the upper limit of the C content is set as 0.15%. The upper limit is preferably 0.08%. The lower limit of C content is preferably 0.005% from the viewpoint of producibility.

Si is effective as a strong deoxidizer. Nevertheless, when Si is added in a large amount, the resultant material becomes hardened, leading to reduction of producibility. Accordingly, the upper limit of Si content is set as 1%. The upper limit is preferably 0.8%. On the other hand, Si has an effect to improve the stress corrosion cracking resistance, which is an object of the present invention sought to be attained. In order to exert this effect, Si content is preferably 0.5% or higher. However, if Si is added in an excessive amount, hardening of the resulting material is promoted. Therefore, the lower limit of Si content is preferably 0.1%, from the viewpoint of producibility.

Mn is an austenite forming element, and is added for the purpose of ensuring stability of the austenitic structure and of enhancing workability. When Mn is added in a large amount, MnS may form, resulting in lowering in corrosion resistance of the thus-obtained material. As a result of that, the stress corrosion cracking resistance, which is an object of the present invention sought to be attained, is impaired. Therefore, the upper limit of the Mn content is set as 2%. The upper limit is preferably 1%. In order to attain the above-described object, the lower limit of Mn content is preferably set as 0.5%.

Ni is an element essential for austenitic stainless steel. In the viewpoint of ensuring stability of the austenitic structure and workability, the lower limit of Ni content is set as 6%. The lower limit is preferably 8%, more preferably 10%. On the other hand, Ni is an expensive and rare element. Moreover, Ni also acts to prevent refinement of crystal grains, which is the object of the present invention sought to be attained. Therefore, the upper limit of Ni content is set as 14%. The upper limit is preferably 10.5% or lower, more preferably 8% or lower.

In order to attain sufficient corrosion resistance, it is required that the Cr content be 16% or higher. Thus, the lower limit of Cr content is set as 16%. The lower limit is preferably 18%. On the other hand, when Cr is added in a large amount, the thus-obtained material becomes hardened and forms δ ferrite or σ phase, resulting in deterioration of workability. Furthermore, the refinement of crystal grains, which is an object of the present invention sought to be attained, is disturbed. Therefore, the upper limit of Cr content is set as 22%. The upper limit is preferably 20%, and more preferably 18%.

Mo may suitably be added in order to improve corrosion resistance and to improve stress corrosion cracking resistance, which is an object of the present invention sought to be achieved. However, Mo is a very expensive and rare element. For this reason, if Mo is added, the upper limit of Mo content is set as 3%. The upper limit is preferably 2.5%. In order to obtain the above-described effect, the lower limit of Mo content is preferably set as 0.1%, and more preferably 2%. Mo content may be 0%.

In addition to the above-described constituents, the austenitic stainless steel of the present invention may contain P and S as a part of inevitable impurities in an amount in the range as described below. P and S are elements detrimental to hot workability and to corrosion resistance. Each content of P and S is preferably set as 0.1% or lower. More preferably, P content is 0.045% or lower. Preferably, S content is 0.03% or lower. More preferably, S content is 0.01% or lower.

Examples of the austenitic stainless steel having the above-described chemical composition include, but not limited to, commercially available SUS301, SUS304, and SUS316. As a specific example of SUS301, a fine-grained austenitic stainless steel comprising, C: 0.15 wt % or less, Si: 1.00 wt % or less, Mn: 2.0 wt % or less, Ni: 6.0 to 8.0 wt %, and Cr: 16.0 to 18.0 wt %, with the balance being Fe and inevitable impurities, may be mentioned. As a specific example of SUS304, a fine-grained austenitic stainless steel comprising C: 0.08 wt % or less, Si: 1.00 wt % or less, Mn: 2.0 wt % or less, Ni: 8.0 to 10.5 wt %, and Cr: 18.0 to 20.0 wt %, with the balance being Fe and inevitable impurities, may be mentioned. As a specific example of SUS316, a fine-grained austenitic stainless steel comprising C: 0.08 wt % or less, Si: 1.00 wt % or less, Mn: 2.0 wt % or less, Ni: 10.0 to 14.0 wt %, Cr: 16.0 to 18.0 wt %, and Mo: 2.0 to 3.0 wt %, with the balance being Fe and inevitable impurities, may be mentioned.

After the grain size of the above-described material is refined to an average grain size of 10 µm or lower, the resulting material can be used in the present invention.

By "fine grain" as used in the present invention is meant that the average grain size is 10 μm or lower. Refinement of crystal grains (to an average grain size of 10 μm or lower, preferably 3 μm or lower, and preferably 0.5 μm or higher) significantly reduces the proportion of the inner surface of the grains from which the cracking may initiate. The average grain size may, for example, be measured by the Steels-Micrographic determination of the apparent grain size as described in Examples.

<Production Steps>

The production process of the fine-grained austenitic stainless steel according to the present invention is characterized by comprising a step of subjecting fine-grained austenitic stainless steel which comprises the above-described steel constituents and has an average grain size of 10 μm or lower to an annealing treatment at a temperature of from 600° C. to 700° C. for 48 hours or longer. These features of the production process of the present invention enables suppressing brittle fracture of the fine-grained austenitic stainless steel and attaining a good tensile strength-ductility balance.

In the production process of a steel sheet according to the present invention, fine-grained stainless steel obtained in the following manner may be used: a cast slab comprising the above-described constituents is hot rolled to form a hot-rolled sheet, followed by annealing the resultant hot-rolled sheet (also referred to as hot-rolled-sheet annealing), then cold rolling the resultant annealed hot-rolled sheet to form a cold-rolled sheet, and finally annealing the resultant cold-rolled sheet (also referred to as cold-rolled-sheet annealing).

The production process prior to the cold-rolled-sheet annealing is not particularly limited, and may be carried out under known conditions. By way of example, it may be carried out in the following manner.

In the hot-rolled-sheet annealing, the temperature of the hot-rolled-sheet annealing is preferably set in the range from 1050 to 1200° C. in order to coarsen the austenitic grains to a grain size of 20 μm or larger prior to the cold rolling, to thereby promote deformation induced martensitic transformation during the cold rolling. When the hot-rolled-sheet annealing is carried out at a temperature lower than 1050° C., the austenitic grain size may become smaller than 20 μm. When the hot-rolled-sheet annealing is carried out at a temperature higher than 1200° C., properties such as acid pickling property may be deteriorated, resulting in deterioration of surface quality. Moreover, annealing at a temperature higher than 1200° C. increases loads of the annealing facility. More preferably, the temperature of the hot-rolled-sheet annealing is in the range from 1080 to 1180° C.

In the cold rolling, in order to promote deformation induced martensitic transformation, it is preferable that the reduction rate be set as 70% or higher and that the rolling temperature be set as 50° C. or lower.

When the reduction rate is lower than 70%, the volume fraction of the deformation induced martensite falls below 50%, making the fine-grained structure difficult to form. The reduction rate is preferably 80% or higher, and more preferably 85% or higher. The upper limit of the reduction rate is not particularly limited, but considering the capabilities of the hot-rolled-sheet production facility and the cold rolling facility, 90% or lower is preferred.

When the rolling temperature is higher than 50° C., the volume fraction of the deformation induced martensite falls below 50%, making the fine-grained structure difficult to form as described above. The lower limit of the rolling temperature is not particularly limited, but from industrial viewpoint, a temperature attainable by water cooling, i.e., not lower than 10° C. is preferred. When the rolling is carried out in a smaller scale facility, the rolling temperature is not limited to not lower than 10° C., but a lower temperature attainable by using cooling means such as liquid nitrogen (e.g., −200° C.) may be used.

Following the cold rolling, the final annealing is carried out at a temperature in the range from 600 to 1050° C. in order to attain an average grain size of 10 μm or lower. When the final annealing is carried out at a temperature lower than 600° C., the strain induced by the cold rolling remains accumulated, leading to insufficient recrystallization of austenitic grains, resulting in significant decrease in workability. Therefore, the lower limit of the final annealing temperature is preferably 750° C. or higher. When the final annealing is carried out at a temperature higher than 1050° C., the growth of the crystal grains in austenite proceeds to a greater degree than expected, resulting in an average grain size of 10 μm or higher. The final annealing is preferably carried out at 900° C. or lower.

When the final annealing is carried out at a temperature in the range from 700 to 900° C., the annealing is preferably carried out for an annealing time longer than 1 hour. The final annealing is more preferably carried out for an annealing time of 2 hours or longer. The upper limit of the period of the last annealing (retention time) is not particularly limited, but 24 hours or shorter is preferred assuming a box annealing, which is an industrially known annealing for chromium stainless. More preferably, the annealing time of the last annealing is in the range from 4 to 24 hours. When the temperature of the last annealing is from above 900° C. to 1050° C., considering the growth of the crystal grain, it is preferable to set the annealing time as 10 minutes or shorter (short retention time). More preferably, the annealing time (retention time) of the last annealing may be 1 minute or shorter.

Next, annealing (retention) treatment (i.e., additional annealing) that is a feature of the production process of the present invention will be described. Following the annealing of the cold-rolled sheet, the resultant steel sheet is retained for a prolonged time at a relatively low temperature. In accordance with the present invention, it is believed that, when the steel sheet is retained under the condition specified above, coarsening of the grain size and concentrating of any particular constituent are suppressed, while strain induced in the microcrystalline structure is relieved and homogenization of the constituents throughout the sheet is promoted, and consequently, embrittlement of the sheet is suppressed and ductility is imparted to the sheet.

Additionally, it is possible that the annealing treatment (additional annealing) as well serves as the last annealing following the cold rolling.

When the annealing temperature is too high, the thus-obtained recrystallized austenitic grains are coarsened, resulting in lowering of the strength. Furthermore, any precipitated matter coagulates and grows in size, distributed in the austenitic grain boundary after recrystallization. As a consequence, the intergranular corrosion resistance and the stress corrosion cracking resistance are deteriorated. When the temperature is too low, a sufficient ductility under environment with varying dissolved oxygen content cannot be obtained. Therefore, the lower limit of the annealing temperature is typically 600° C. or higher, higher than 600° C., 650° C. or higher, 680° C. or higher, or 690° C. or higher, whereas the upper limit is 700° C. or lower or lower than 700° C.

With regard to the annealing time, in order to sufficiently suppress embrittlement and to impart ductility, it is typically set as 48 hours or longer, 60 hours or longer, 72 hours or longer, 84 hours or longer, 96 hours or longer, or 100 hours or longer. The upper limit is not particularly limited, but in view of efficiency or other parameters, it is set, for example, as 1000 hours or shorter, 500 hours or shorter, 300 hours or shorter, or 200 hours or shorter.

<Stainless Steel>

The fine-grained austenitic stainless steel of the present invention is characterized by exhibiting, independently of the dissolved oxygen content, excellent physical properties under tensile stress at high temperatures. Therefore, the fine-grained austenitic stainless steel of the present invention may suitably be used as a material such as a member for a nuclear application.

The present invention employing the annealing step as specified above that is performed at a lower temperature for a prolonged time (e.g., at from 600° C. to 700° C. for 24 hours or longer) makes it possible to obtain a stainless steel having the specific physical properties of the present invention.

One aspect of the present invention is a fine-grained austenitic stainless steel having the above-described steel composition and an average grain size of 10 μm or lower, wherein the stainless steel shows a tensile strength×elongation balance of 17000 MPa % or higher in slow strain rate test at a temperature of 325° C. and a pressure of 15 MPa with a dissolved oxygen content lower than 1 ppb. By "with dissolved oxygen content lower than 1 ppb" it is meant that, assuming that the minimum detectable quantity is 1 ppb, no dissolved oxygen is detected. The stainless steel of the present invention shows, independently of the dissolved oxygen content (e.g., from <1 ppb to 8.0 ppm), an excellent tensile strength×elongation balance.

One aspect of present invention is a fine-grained austenitic stainless steel having the above-described steel composition and an average grain size of 10 μm or lower, wherein the stainless steel shows a tensile strength of 750 MPa or higher and an elongation of 22% or higher in slow strain rate test at a temperature of 325° C. and a pressure of 15 MPa with a dissolved oxygen content lower than 1 ppb. The stainless steel of the present invention shows, independently of the dissolved oxygen content (e.g., from <1 ppb to 8.0 ppm), an excellent tensile strength and an elongation.

The tensile strength and the elongation may be determined, for example, by SSRT test as described in Examples. The tensile strength is not particularly limited, but typically is 750 MPa or higher, preferably 900 MPa or higher, and more preferably 1000 MPa or higher. The upper limit is not particularly limited, but from the viewpoint of properties such as workability, 1500 MPa or lower is preferred. The elongation is not particularly limited, but typically is 22% or higher, preferably 23% or higher, more preferably 50% or higher, and still more preferably 60% or higher. The upper limit is not particularly limited, but from the viewpoint of properties such as workability, the upper limit is 70% or lower.

The tensile strength×elongation balance is employed as a measure of a steel sheet having high strength and ductility. The tensile strength×elongation balance is the multiplied product of a tensile strength by an elongation, each of which are measured in the above-described test. The tensile strength×elongation balance is not particularly limited, but typically is 17000 MPa % or higher, preferably 25000 MPa % or higher, and more preferably 28000 MPa % or higher.

One aspect of the present invention is a fine-grained austenitic stainless steel having the above-described steel composition and an average grain size of 10 μm or lower, wherein the stainless steel shows a percent brittle fracture of lower than 6% at a temperature of 325° C. and a pressure of 15 MPa with a dissolved oxygen content lower than 1 ppb. In the stainless steel of the present invention, independently of dissolved oxygen content (e.g., from <1 ppb to 8.0 ppm), embrittlement is suppressed, and consequently showing a low percent brittle fracture.

The percent brittle fracture is the percentage of the brittle fracture surface area with respect to the total fracture surface area formed in a specimen ruptured by tensile stress, for example, during SSRT as described in Examples. The percent brittle fracture is not particularly limited, but is typically lower than 6%, preferably lower than 5%, and more preferably lower than 0.1%.

One aspect of the present invention is a fine-grained austenitic stainless steel having the above-described steel composition, wherein the chromium carbide content of the stainless steel is not higher than 30% with respect to the chromium carbide content of the raw material thereof, i.e., coarse-grained stainless steel.

The chromium carbide content of the stainless steel can be determined, for example, by X-ray diffraction analysis described in Examples. More specifically, the surface of the stainless steel is analyzed by X-ray diffractometry, and peak intensities assigned to chromium carbide are determined. When the peak intensity assigned to chromium carbide (i.e., chromium carbide content) of the coarse-grained stainless steel is set to 100%, the peak intensity assigned to chromium carbide (i.e., chromium carbide content) of the stainless steel of the present invention is not higher than 30%, preferably not higher than 10%, and more preferably not higher than 1%.

The peaks assigned to chromium carbide are present at diffraction angles in the vicinity of $2\theta=52°$ and $76°$ as measured by X-ray diffractometer using CuKα radiation. The expression "in the vicinity of $2\theta=52°$" means, for example, $2\theta=52\pm0.5°$, and "in the vicinity of $2\theta=76°$" means, for example, $2\theta=76\pm0.5°$.

Chromium carbide may be the one that is confirmed by either peak observed in the vicinity of $2\theta=52°$ or $76°$, or by both peaks observed in the vicinity of $2\theta=52°$ and $76°$.

One aspect of the present invention is a fine-grained austenitic stainless steel having the above-described steel composition and having a Si concentration in the stainless steel that varies in the range less than ±0.3 wt % with respect to the Si concentration of the coarse-grained stainless steel, i.e., the raw material of the fine-grained austenitic stainless steel.

The Si concentration profile in the stainless steel can be determined, for example, by the analysis using Electron Probe Micro Analyzer (EPMA) as described in Examples. More specifically, a line analysis across a selected area on the surface of the stainless steel is performed. Then the average or the maximum Si concentration in the selected area is determined, and the variation thereof with respect to the Si concentration of the raw material, i.e., the coarse-grained stainless steel is determined.

The variation of the Si concentration in the stainless steel is not particularly limited, but typically is in the range less than ±0.3%, preferably less than ±0.2%, and more preferably less than ±0.1% with respect to the Si concentration (analytical value such as formed analysis, product analysis) of the raw material, i.e., the coarse-grained stainless steel.

EXAMPLES

Hereinbelow, the present invention will be described in more detail with reference to examples, but the present invention is not limited thereto.

Figure 1A:
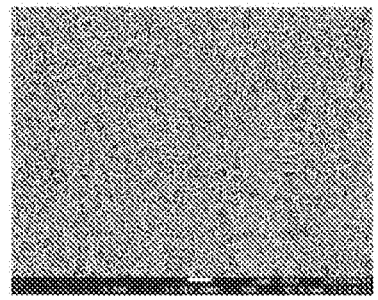
FIGS. 1A and 1B show optical microscope images (photographs) of the microstructure from a fine-grained stainless steel as refined and a fine-grained stainless steel undergone an anneal treatment at 600° C. for 100 hours.

The austenitic stainless steel employed in this embodiment was SUS304 steel, the constituents of which is suitable for a wide variety of applications. The constituents are as follows: C: 0.10% or lower, Si: 1.00% or lower. Mn: 2.0% or lower, Ni: 8 to 12%, Cr: 18 to 22%, with the balance being Fe and inevitable impurities. Hereinafter, the stainless steel prior to the grain refinement is referred to as "coarse-grained stainless steel". Subsequently the coarse-grained stainless steel was subjected to severe cold rolling, and the thus-obtained material was retained at a temperature of from 600° C. to 1050° C. for a period of from 1 minute to 24 hours, to thereby induce reversion from deformation induced martensite to austenite. Hereinafter, the stainless steel with refined grains obtained from the above-described procedure is referred to as "fine-grained stainless steel as refined". The average grain size in this case was determined by a method named "Steels-Micrographic determination of the apparent grain size" according to JIS G 0551. As a result, as shown in FIG. 1A, the fine-grained stainless steel having an average grain size of 2.64 μm with non-flat shape was formed (600° C. to 1050° C., annealing time shorter than 1 hour).

Figure 1B:
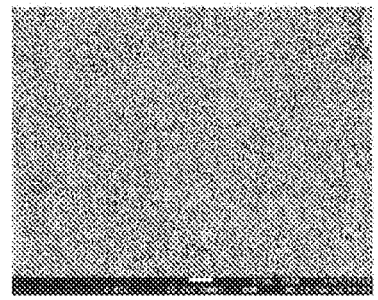

In order to investigate coarsening tendency of the crystal grains by the heat treatment, the fine-grained stainless steel as refined was retained at 600° C. for 100 hours. In FIG. 1B, the microstructure of the resultant material is shown. The average grain size was found to be 2.67 μm. In spite of the prolonged retention, no grain coarsening was observed.

Figure 2:
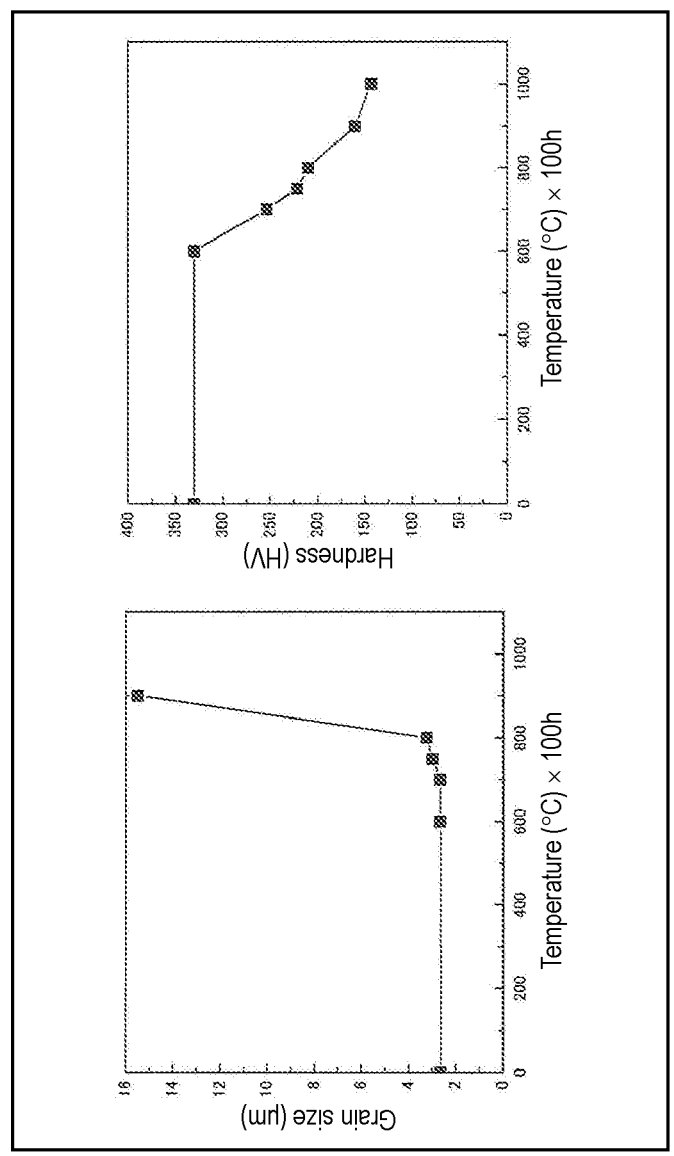
FIG. 2 illustrates the changes in grain size and hardness after retaining a fine-grained stainless steel SUS304 at different temperatures for 100 hours. The left graph shows the change in grain size. The right graph shows the change in hardness.

In FIG. 2, changes of the grain size and the hardness during retention of the fine-grained stainless steel as refined in different temperatures for 100 hours are shown. The hardness was measured by the hardness test method in accordance with JIS Z2244. When the material was retained at different temperatures in a region up to 700° C. for 100 hours, the grain sizes were roughly similar as those of the fine-grained stainless steel as refined, whereas when the material was retained in a temperature region of 800° C. or higher, coarsening was gradually accelerated, and coarsened to 15 μm at 900° C. When the temperature is 1000° C., a drastic coarsening to 114 μm was observed. On the other hand, the hardness was not significantly changed with the rise of temperature from the fine-grained stainless steel as refined, the hardness thereof being (HV)317, through the material obtained by retaining the fine-grained stainless steel as refined at 600° C. for 100 hours. When the temperature exceeds 600° C., the hardness was decreased linearly as the temperature rose, and reached HV150 at 1000° C. In view of the foregoing, it can be said that, unless the temperature exceeds 700° C., the crystal grains are not coarsened drastically and as well, the strength does not decrease significantly even if the fine-grained stainless steel is heat treated for a prolonged time, i.e., 100 hours or longer.

Figure 3:
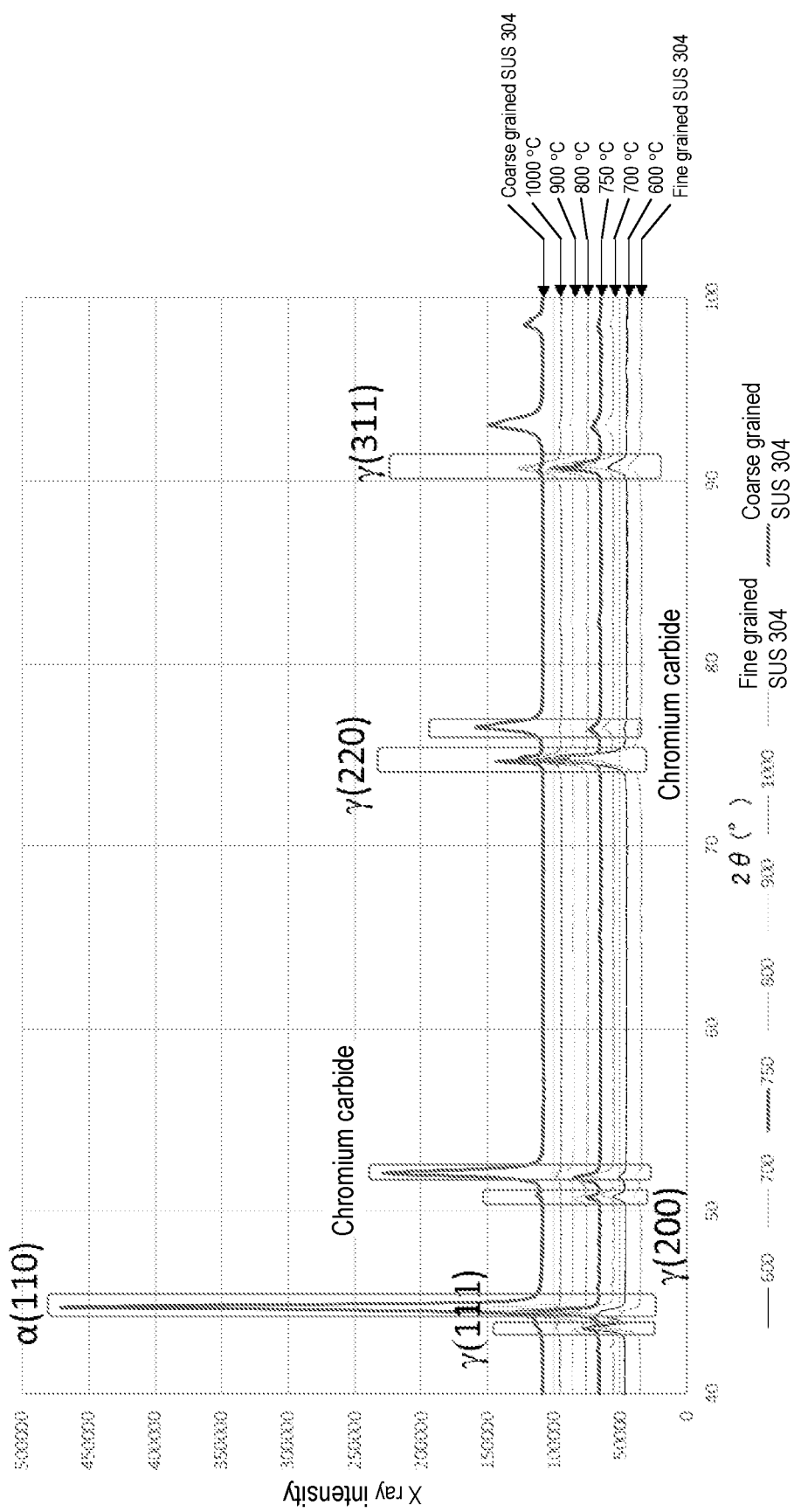
FIG. 3 illustrates the results of X-ray diffraction analysis on a coarse-grained stainless steel, a fine-grained stainless steel as refined, and materials obtained by retaining these steels at different temperatures.

FIG. 3 shows X-ray diffraction patterns of the coarse-grained stainless steel SUS304, the fine-grained stainless steel as refined, and the materials obtained by retaining the fine-grained stainless steel as refined at different temperatures for 100 hours. The X-ray diffraction patterns were obtained by the test method specified in JIS K0131. More specifically, the X-ray diffraction patterns were obtained under the following conditions: radiation: CuKα, generator voltage and current: 40 kV, 40 mA, measuring angle range: 40-100°, step angle: 0.02°, scan speed: 2°/sec. Peaks corresponding to the γ phase were observed in the patterns of the fine-grained stainless steel as refined and the materials obtained by retaining the fine-grained stainless steel as refined at temperatures up to 650° C. for 100 hours. However, when the fine-grained stainless steel as refined was retained at 700° C. for 100 hours, remarkable peaks corresponding to chromium carbide were appeared in the vicinity of 2θ=52° and 76°. In view of the foregoing, it is assumed that the fine-grained stainless steel SUS304, when retained at a temperature lower than 700° C., shows a phase constitution similar to that of the fine-grained stainless as refined, whereas when the temperature exceeds 700° C., chromium carbide is gradually formed, and when the temperature reaches 750° C., the area adjacent to the chromium carbide become totally Cr deficient, resulting in development of sensitization. On the other hand, intensities of the peaks in the vicinity of 2θ=52° and 76° observed in the pattern from the coarse-grained stainless steel SUS304 were obviously higher as compared with the similar peaks of the fine-grained stainless steel SUS304. Assuming that the intensity of each of the peak corresponding to chromium carbide formed in the coarse-grained stainless steel SUS304 (i.e., intensity of each peak in the vicinity of 2θ=52° and 76°) is set as 100%, the amount of the carbide formed in the fine-grained stainless steel SUS304 heated at 750° C., whose peak intensity corresponding to the carbide is the highest among the fine-grained stainless steel SUS304, can be estimated as 15 to 30%. In view of the foregoing, it is said that it is possible to obtain fine-grained stainless steel SUS304 containing chromium carbide in an amount significantly lower than the conventional coarse-grained stainless steel SUS304. In addition, when the subsequent anneal treatment is carried out at a temperature from 600 to 700° C., formation of chromium carbide can be suppressed.

Table 1 shows the results of SSRT test performed on various materials at a crosshead displacement rate of 0.005 mm/min with different dissolved oxygen contents varied widely from <1 ppb to 8 ppm. In this test, the environment of Pressurized Water Reactor (PWR) was simulated as follows: temperature: 325° C., pressure: 15 MPa, dissolved hydrogen: <1 ppb. The conventional material of the coarse-grained stainless steel SUS304 and SUS316, both of which have a grain size on the order of 100 μm, showed a tensile strength of about 560 MPa and an elongation of 35% with <1 ppb, and a tensile strength of about 590 MPa and a percentage elongation after fracture of 39 to 44% with 8 ppm. On the other hand, the fine-grained stainless steel SUS304 having a grain size of 2.64 μm showed a high tensile strength of 900 to 930 MPa with the both dissolved oxygen contents of <1 ppb and 8 ppm, while showing significantly low percentage elongation after fracture of 7 to 9% with the both dissolved oxygen contents. In addition, the percent brittle fracture of these materials was compared to one another. The percent brittle fracture of the coarse-grained stainless steel was 12 to 24% with the dissolved oxygen content of <1 ppb, while the fine-grained stainless steel as refined showed as low as around 5% with the dissolved oxygen content of <1 ppb, and no brittle fracture surface was observed with the dissolved oxygen content of 8 ppm. In view of the foregoing, it seems that the fine-grained stainless steel as refined has low tendency to undergo brittle fracture in the PWR environment. Furthermore, when this material was subjected to the anneal treatment by retaining the material at 600° C. for 100 hours, the resultant material showed a percent brittle fracture equivalent to that of the fine-grained stainless steel as refined with the both dissolved oxygen contents, and showed an improved elongation and maximum stress×elongation balance (tensile strength×elongation balance). The percent brittle fracture of the material retained at 700° C. for 100 hours was similar or lowered as compared with that of the fine-grained stainless steel as refined, while the elongation and the maximum stress×elongation balance were significantly improved. In view of the foregoing, it can be seen that the prolonged anneal treatment at a lower temperature imparts an excellent strength-ductility balance under tensile stress at an elevated temperature. In particular, the material subjected to the heat treatment at 700° C. for 48 hours or longer is imparted with excellent mechanical properties in that the material shows the maximum stress×elongation balance of 17000 MPa·% or higher.

steel, the fine-grained stainless steel as refined, and the materials obtained by retaining the fine-grained stainless steel at different temperatures. These data were obtained from SSRT test performed with a dissolved oxygen content of <1 ppb. More specifically, brittle fracture surfaces of specimens fractured during the SSRT test were observed using a scanning electron microscope (SEM), and the percent brittle fracture was calculated therefrom. The conven-

TABLE 1

| specimen name | dissolved oxygen content | displacement rate [mm/s] | tensile strength [MPa] | percentage total extension at maximum force [%] | percentage elongation after fracture [%] | maximum stress × elongation [MPa · %] | grain size [µm] | percent brittle fracture [%] |
|---|---|---|---|---|---|---|---|---|
| coarse grained SUS316 | <1 ppb | 0.005 | 564 | 31.6 | 35 | 19740 | 109 | 12 |
| coarse grained SUS304 | <1 ppb | 0.005 | 558 | 30.6 | 35 | 19530 | 116 | 24 |
| fine grained SUS304 | <1 ppb | 0.005 | 900 | 7.2 | 8.9 | 8010 | 2.64 | 5.4 |
| fine grained SUS304 + 600° C. × 100 h | <1 ppb | 0.005 | 901 | 8.66 | 11 | 9911 | 2.67 | 5.4 |
| fine grained SUS304 + 700° C. × 24 h | <1 ppb | 0.005 | 783 | 16.3 | 21 | 16443 | 2.67 | — |
| fine grained SUS304 + 700° C. × 48 h | <1 ppb | 0.005 | 773 | 19.4 | 22 | 17006 | 2.67 | — |
| fine grained SUS304 + 700° C. × 100 h | <1 ppb | 0.005 | 768 | 19.8 | 23 | 17664 | 2.67 | 5 |
| coarse grained SUS316 | 8 ppm | 0.005 | 593 | 34.6 | 39 | 23127 | 109 | 0 |
| coarse grained SUS304 | 8 ppm | 0.005 | 591 | 39.2 | 44 | 26004 | 116 | 0 |
| fine grained SUS304 | 8 ppm | 0.005 | 930 | 6.4 | 7.9 | 7347 | 2.64 | 0 |
| fine grained SUS304 + 600° C. × 100 h | 8 ppm | 0.005 | 887 | 9.9 | 12 | 10644 | 2.67 | 0 |
| fine grained SUS304 + 700° C. × 100 h | 8 ppm | 0.005 | 845 | 21.8 | 23 | 19435 | 2.67 | 0 |

Figure 4:
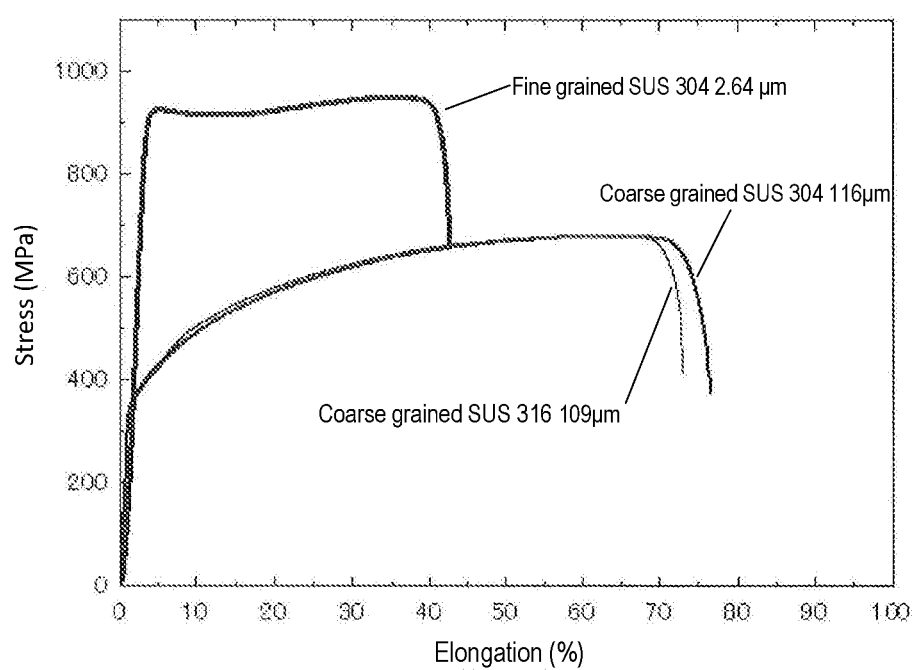
FIG. 4 illustrates the results of the tensile testing at room temperature for a fine-grained stainless steel SUS304 as refined, a coarse-grained stainless steel SUS304, and a coarse-grained stainless steel SUS316.

FIG. 4 shows the results of the tensile testing at room temperature of the fine-grained stainless steel SUS304 as refined, the coarse-grained stainless steel SUS304, and the coarse-grained stainless steel SUS316. Their mechanical properties were determined by the tensile testing method specified in JIS Z2241. It shows that the fine-grained stainless steel SUS304 as refined has a tensile strength of 900 MPa and an elongation of 40% or higher, showing an excellent strength-ductility balance, whereas each of the coarse-grained stainless steels has a lower tensile strength of around 600 MPa, although showing a higher elongation of 70% or higher. Based on the comparison of the SSRT test results, it seems that the elongation was lowered in each case under PWR environment containing dissolved oxygen.

On the other hand, the fine-grained stainless steel as refined undergone the annealing treatment at from 600° C. to 700° C. for 48 hours or longer shows an excellent ductility while retaining a high strength.

Figure 5:
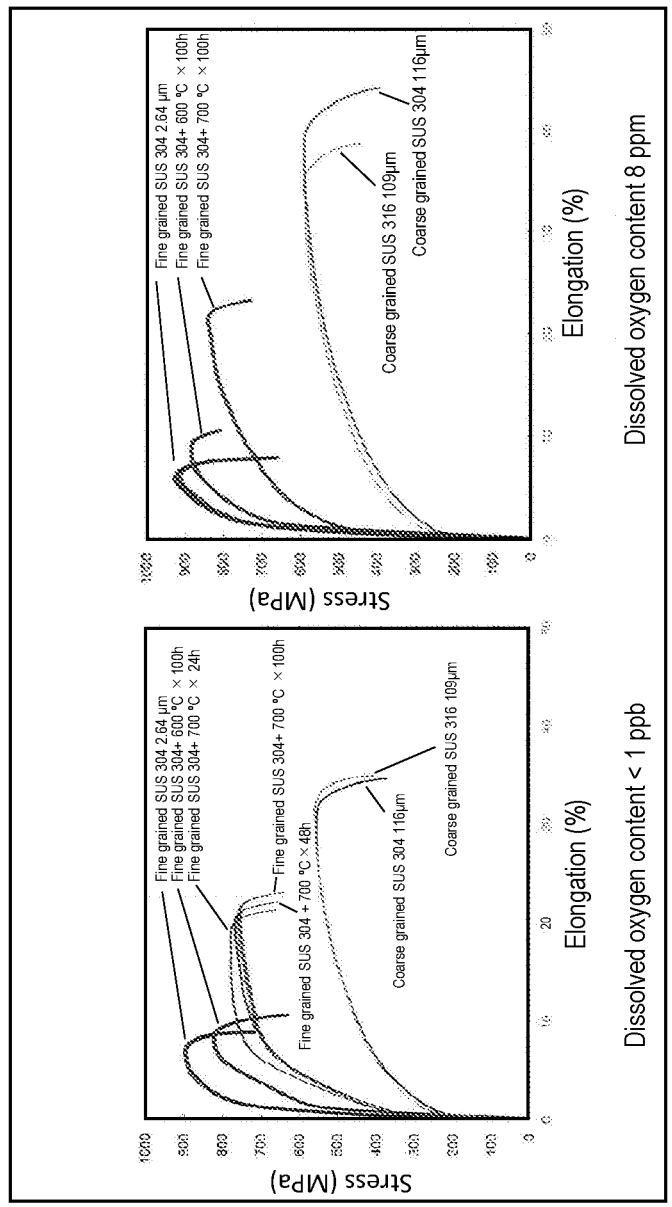
FIG. 5 illustrates the stress-strain diagrams during SSRT test (with dissolved oxygen content of <1 ppb or 8 ppm) for different materials.

FIG. 5 shows stress-strain diagrams for the coarse-grained stainless steel, the fine-grained stainless steel SUS304 as refined, and the materials obtained by retaining the fine-grained stainless steel SUS304 at different temperatures for different periods. For each dissolved oxygen content of <1 ppb and 8 ppm, the fine-grained stainless steel as refined fractured shortly after the maximum force was attained. On the other hand, the material retained at 700° C. for 48 hours or longer kept its tensile strength of about 800 MPa, which strength is considerably higher than 600 MPa of the conventional materials, i.e., the coarse-grained stainless steel SUS304 and the coarse-grained stainless steel SUS316, while exhibiting an elongation of 22%, which elongation is close to that of the coarse-grained stainless steel.

Figure 6:
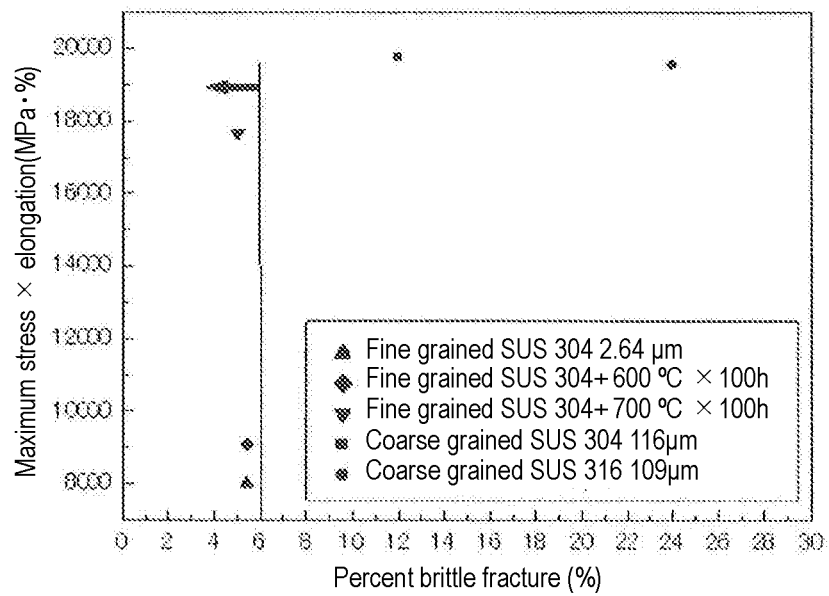
FIG. 6 illustrates the correlation between the maximum stress×elongation and the percent brittle fracture obtained from SSRT test with a dissolved oxygen content of <1 ppb for different materials.

FIG. 6 shows a graph of maximum stress×percentage elongation (after fracture) versus percent brittle fracture for the conventional material, i.e., the coarse-grained stainless tional material, i.e., coarse-grained stainless steel, showed, in each case, a high percent brittle fracture of 12% or higher, whereas the fine-grained stainless steel as refined and the materials obtained by retaining the fine-grained stainless steel with heating showed, in each case, a very low percent brittle fracture of lower than 6% independently of the retention temperature. It shows that the maximum stress× elongation after fracture balance of the fine-grained stainless steel retained with heating was improved as compared with that of the fine-grained stainless steel as refined. Especially, it also shows that the material retained at 700° C. for 100 hours exhibits the strength-elongation balance comparable to that of the conventional material. In view of the foregoing, it can be said that, the preferred heat treatment condition for improving premature fracture of the fine-grained stainless steel as refined is to heat the material at 700° C. for 48 hours or longer.

Figure 7:
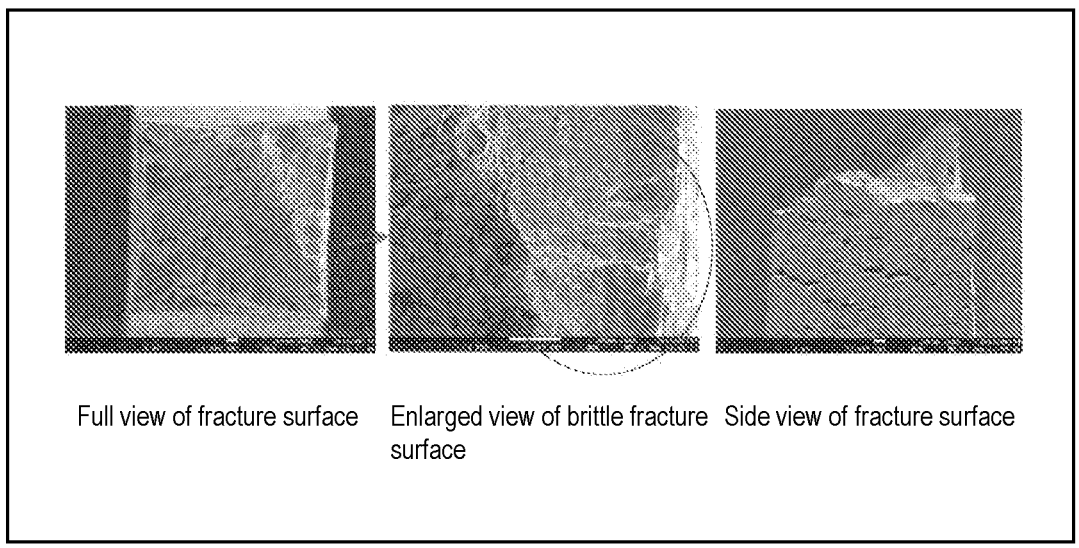
FIG. 7 illustrates SEM images of the fracture surfaces (photographs) of a coarse-grained stainless steel SUS304; the fracture surface was formed during SSRT test performed at 325° C./15 MPa with a dissolved oxygen content of <1 ppb.
Figure 8:
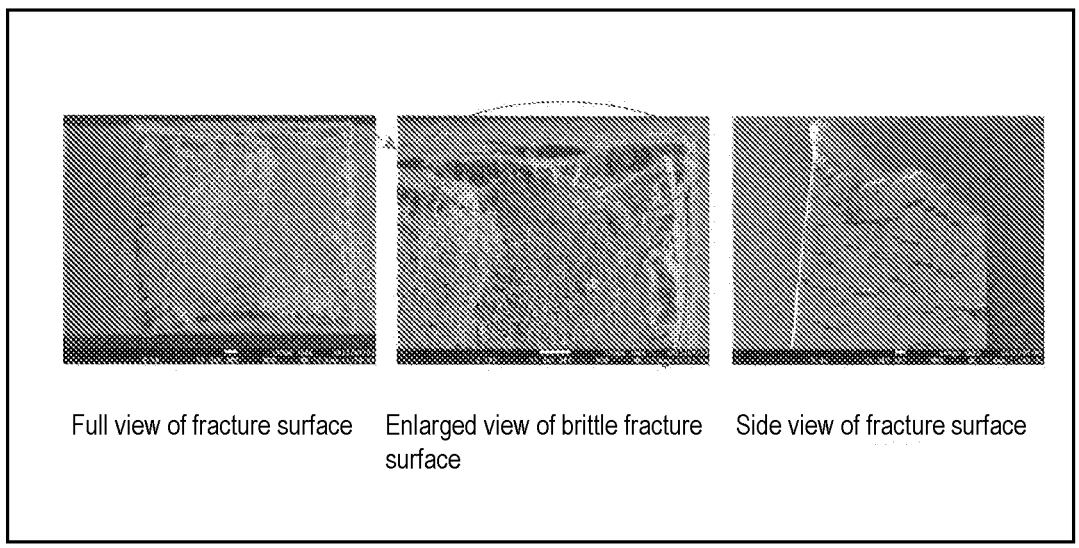
FIG. 8 illustrates SEM images of the fracture surfaces (photographs) of a coarse-grained stainless steel SUS316; the fracture surface was formed during SSRT test performed at 325° C./15 MPa with a dissolved oxygen content of <1 ppb.

FIG. 7 shows SEM observation results of the fracture surfaces of the coarse-grained stainless steel SUS304, and FIG. 8 shows the fracture surfaces of the coarse-grained stainless steel SUS316, both of which surfaces were formed during SSRT test performed with a dissolved oxygen content of <1 ppb. Many brittle fracture surfaces were observed on the side face, whereas many cracks caused by embrittlement were observed on the side view of fracture surface.

Figure 9:
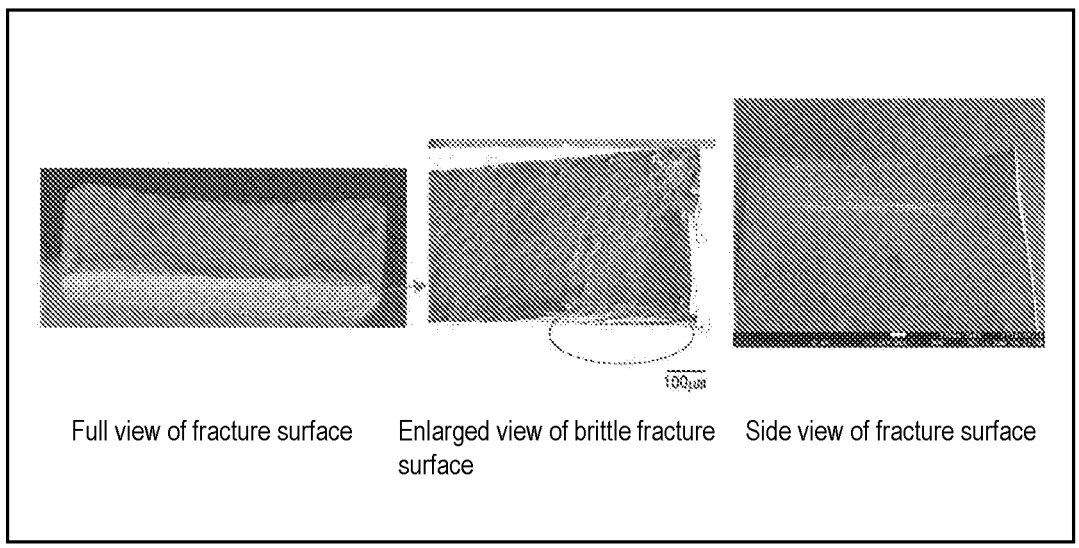
FIG. 9 illustrates SEM images of the fracture surfaces (photographs) of a fine-grained stainless steel SUS304; the fracture surface was formed during SSRT test performed at 325° C./15 MPa with a dissolved oxygen content of <1 ppb.
Figure 10:
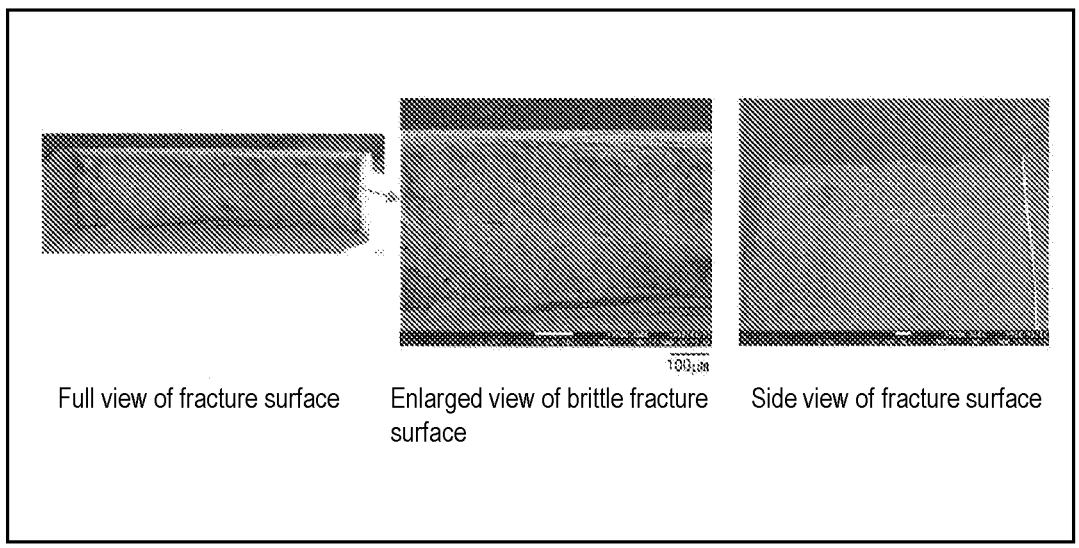
FIG. 10 illustrates SEM images of the fracture surfaces (photographs) of a fine-grained stainless steel SUS304 undergone an anneal treatment at 600° C. for 100 hours; the fracture surface was formed during SSRT test performed at 325° C./15 MPa with a dissolved oxygen content of <1 ppb.
Figure 11:
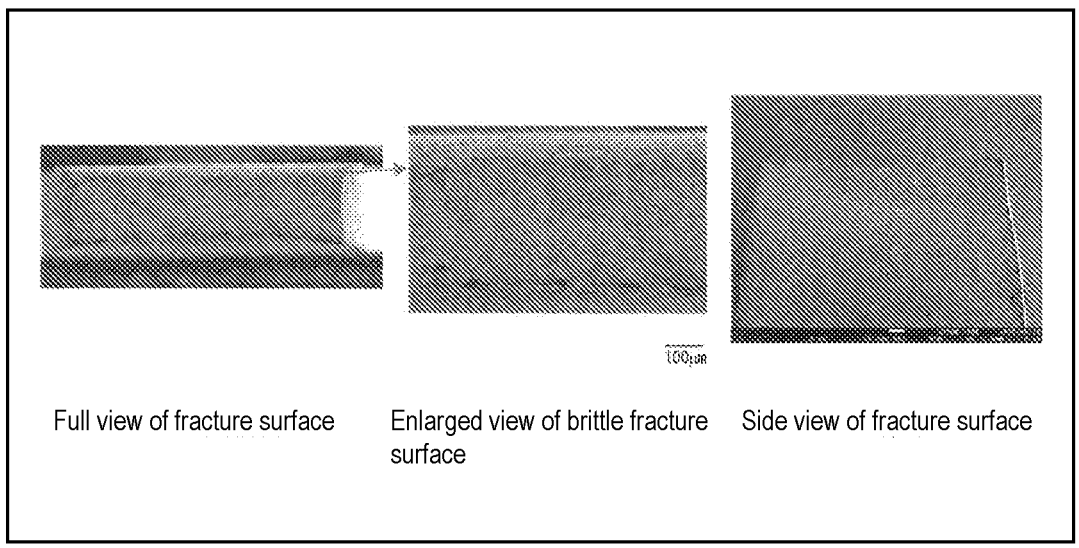
FIG. 11 illustrates SEM images of the fracture surfaces (photographs) of a fine-grained stainless steel SUS304 undergone an anneal treatment at 700° C. for 100 hours; the fracture surface was formed during SSRT test performed at 325° C./15 MPa with a dissolved oxygen content <1 ppb.

FIGS. 9, 10, and 11 show SEM observation results of the fracture surfaces formed during the SSRT test with a dissolved oxygen content of <1 ppb of the fine-grained stainless steel as refined, and materials obtained by retaining the fine-grained stainless steel as refined at 600° C. for 100 hours or 700° C. for 100 hours. Brittle fracture was found only a part of the whole fracture surface on each specimen. Nevertheless, many small cracks were observed on the side view of fracture surface of the fine-grained stainless steel as refined. However, it was also demonstrated that the frequency of cracking was decreased as the retention temperature rose from 600° C. to 700° C.

Figure 12:
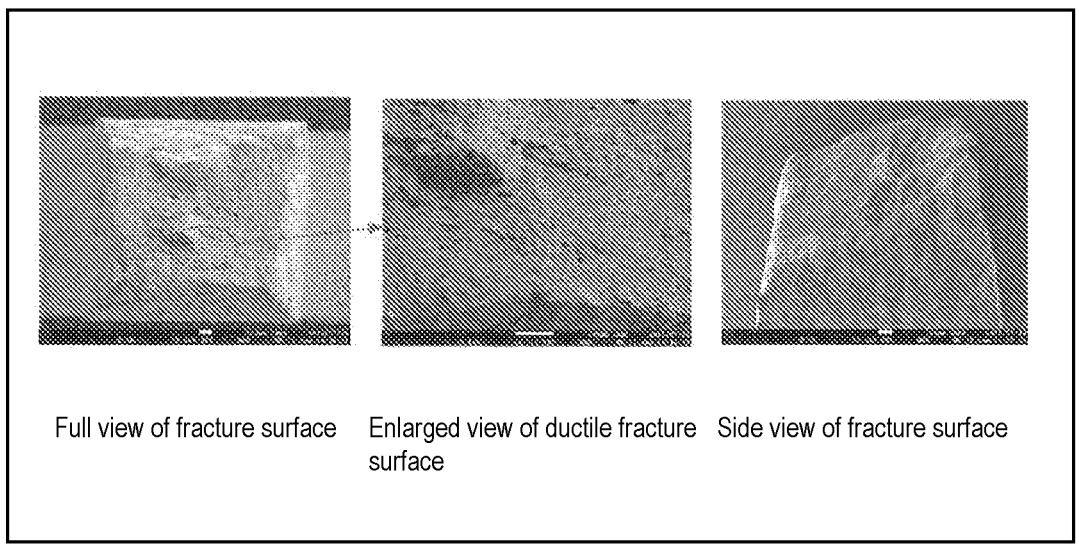
FIG. 12 illustrates SEM images of the fracture surfaces (photographs) of a coarse-grained stainless steel SUS304; the fracture surface was formed during SSRT test performed at 325° C./15 MPa with a dissolved oxygen content of 8 ppm.
Figure 13:
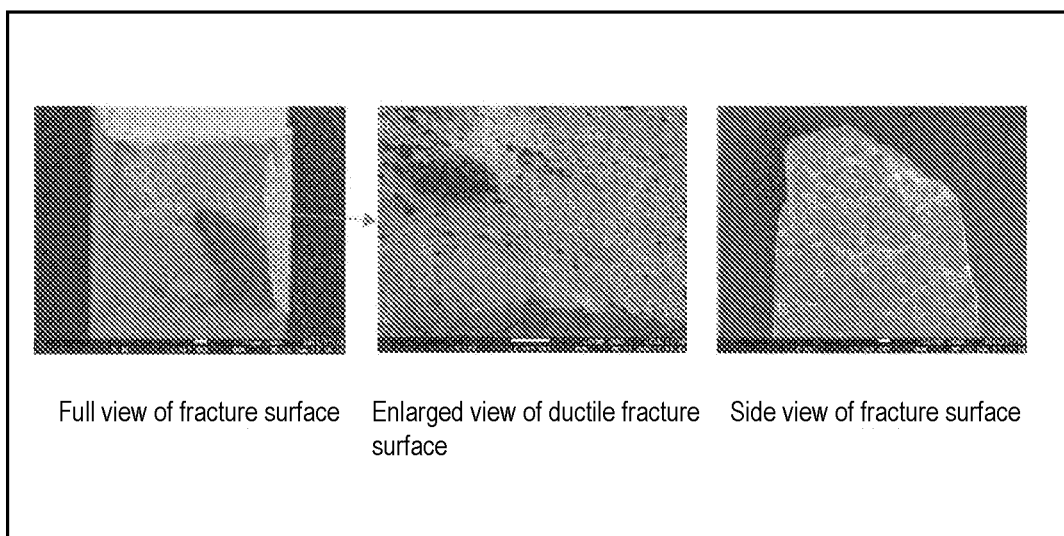
FIG. 13 illustrates SEM images of the fracture surfaces (photographs) of a coarse-grained stainless steel SUS316.

FIGS. 12 and 13 show SEM observation results of the fracture surfaces formed during the SSRT test with a dissolved oxygen content of 8 ppm of the coarse-grained stainless steel SUS304 and of the coarse-grained stainless steel SUS316, respectively. Only ductile fracture surfaces were observed on each specimen, and no crack was observed on the side view of fracture surfaces.

FIGS. 14, 15, and 16 show SEM observation results of the fracture surfaces formed during the SSRT test with a dissolved oxygen content of 8 ppm of the fine-grained stainless steel as refined, and materials obtained by retaining the fine-grained stainless steel as refined at 600° C. for 100 hours or 700° C. for 100 hours. In each specimen, an obvious necking was observed and only ductile fracture surfaces were observed. Although some cracks were observed on the side view of fracture surface, the frequency of cracking was obviously decreased from those in FIGS. 9, 10, and 11.

FIG. 17 shows the results of the line analysis by EPMA for Si element along the direction perpendicular to the rolling direction of the fine-grained stainless steel SUS304 and materials obtained through the annealing treatment at different temperatures. Here, EPMA line scan analysis was performed with 0.12 μm step size and 30 μm scan length (analyzing crystal: LiF, accelerating voltage: 15 kV, electron beam current: $2.0 \times 10^{-8}$ A, electron beam diameter: 1 μm). Then, the Si concentration for each scan point within the scan length on the fine-grained stainless steel SUS304 and the materials undergone anneal treatment was compared with the Si concentration of the raw material, i.e., the coarse-grained stainless steel SUS304. For the fine-grained stainless SUS304 steel, enrichment of the trace element Si in some area was confirmed. Based on the Si concentration profile showing the enrichment of the constituent, it is likely that a segregation of the constituents occurred depending on metal flow during severe cold-rolling. However, it was found that, when the fine-grained stainless steel was subjected to the anneal treatment at from 600° C. to 750° C., the segregation of the constituents was alleviated (the variation of the Si concentration with respect to that of the raw material, i.e., coarse-grained stainless steel become less than ±0.3 wt %), thus the segregation was improved. In view of the foregoing, it seems that the segregation of the constituents is one of the causes of the brittle fracture that occurs during SSRT test for the fine-grained stainless steel SUS304.

In view of the foregoing, it is believed that, when a fine-grained stainless steel SUS304 is subjected to an annealing treatment at from 600 to 700° C. for a prolonged time, a material suitable for a nuclear application can be obtained, which material is not influenced by the dissolved oxygen content and has an excellent strength×elongation balance.

The above-described facts indicate that, different from the previous approach for material development intending to suppress stress corrosion cracking by means of modifying the constituents, it may be possible to create a material that can withstand severe PWR environment by means of refining the grain size of the conventional material followed by retaining the resultant material at a controlled temperature. Furthermore, it seems that this anneal treatment also contribute to control the crystal grain boundary structure and to suppress grain boundary corrosion.

It has been found that, a material suitable for a nuclear application having less tendency toward embrittlement depending on varying dissolved oxygen content and having an excellent strength-ductility balance can be obtained by means of refining a grain size of conventional stainless steel so as to form a fine-grained stainless steel, followed by subjecting the resultant material to an annealing treatment at from 600 to 700° C. for a prolonged time. In particular, the thus-obtained material would undergo little or no coarsening of the grain size and remain stable up to 700° C. For this reason, the application spectrum of the material can be extended to not only a nuclear application, especially for a nuclear fuel cladding, but also to a heat resistant material for power generation that is assumed to be used at 700° C. or lower.

INDUSTRIAL APPLICABILITY

The present invention is applicable to a nuclear application and others.

What is claimed is:

1. A fine-grained austenitic stainless steel comprising: C: 0.15 wt % or less, Si: 1.00 wt % or less, Mn: 2.0 wt % or less, Ni: 6.0 to 14.0 wt %, Cr: 16.0 to 22.0 wt %, and Mo: 3.0 wt % or less, with the balance being Fe and inevitable impurities, and having an average grain size of 3 μm or lower, wherein said fine-grained austenitic stainless steel exhibits a tensile strength×elongation balance of 17000 MPa % or higher in slow strain rate test at a temperature of 325° C. and a pressure of 15 MPa in the presence of a dissolved oxygen content of lower than 1 ppb, and wherein a chromium carbide content of said fine-grained austenitic stainless steel is not more than 1% with respect to a chromium carbide content of a raw material thereof, coarse-grained stainless steel.

2. The fine-grained austenitic stainless steel according to claim 1, wherein said fine-grained austenitic stainless steel exhibits a tensile strength of 750 MPa or higher and an elongation of 22% or higher in slow strain rate test at a temperature of 325° C. and a pressure of 15 MPa in the presence of a dissolved oxygen content of lower than 1 ppb.

3. The fine-grained austenitic stainless steel according to claim 1, wherein said fine-grained austenitic stainless steel exhibits a percent brittle fracture of lower than 6% at a temperature of 325° C. and a pressure of 15 MPa in the presence of a dissolved oxygen content of lower than 1 ppb.

4. The fine-grained austenitic stainless steel according to claim 1, wherein the variation in a Si concentration in said stainless steel is in the range less than ±0.3 wt % with respect to a Si concentration of a raw material thereof, coarse-grained stainless steel.

5. The fine-grained austenitic stainless steel according to claim 1, wherein said stainless steel is used in a nuclear application.

* * * * *